United States Patent [19]

Fichtner

[11] 3,728,491

[45] Apr. 17, 1973

[54] STEREOPHONIC FM RECEIVERS HAVING DECODERS EMPLOYING FIELD EFFECT TRANSISTORS

[75] Inventor: Roland H. Fichtner, Waterloo, Ontario, Canada

[73] Assignee: Electrohome Limited, Kitchener, Ontario, Canada

[22] Filed: Mar. 5, 1971

[21] Appl. No.: 121,373

[52] U.S. Cl. ................................ 179/15 BT, 307/251

[51] Int. Cl. ................................ H04h 5/00

[58] Field of Search ..................... 179/15 BT; 329/50, 329/110; 307/251, 279, 304

[56] References Cited

UNITED STATES PATENTS

| | | | |
|---|---|---|---|
| 3,258,537 | 6/1966 | Proctor | 179/15 BT |
| 3,246,177 | 4/1966 | Schroeder | 179/15 BT |
| 3,264,413 | 8/1966 | Merritt | 179/15 BT |
| 3,584,154 | 6/1971 | McShan | 179/15 BT |
| 3,662,113 | 5/1972 | Von Recklinghausen | 179/15 BT |

*Primary Examiner*—Kathleen H. Claffy
*Assistant Examiner*—Thomas D'Amico
*Attorney*—Sim & McBurney

[57] ABSTRACT

The conventional four diodes of a stereophonic decoder are replaced by two field effect transistors, the composite FM signal being applied to the input electrodes of the field effect transistors and the 38 kHz switching signal being applied to the gate electrodes thereof.

10 Claims, 4 Drawing Figures

INVENTOR.
ROLAND H. FICHTNER
BY

STEREOPHONIC FM RECEIVERS HAVING DECODERS EMPLOYING FIELD EFFECT TRANSISTORS

This invention relates to FM receivers. More specifically, this invention relates to stereophonic decoders for FM receivers.

In accordance with regulations currently prescribed by the F.C.C. in the United States and D.O.C. in Canada, the composite signal for use in FM multiplex transmission must have the following mathematical form:

$$M(t) = (L+R) + (L-R)\cos \omega t + P\cos (\omega/2)\, t$$

where $M(t)$ is the composite signal $L$ is the left channel audio signal $R$ is the right channel audio signal $P$ is the pilot carrier amplitude $\omega = 2\pi f$, f presently being 38 kHz In the foregoing equation, $(L+R)$ is the sum of the left and right audio channel signals and, therefore, is called the monophonic signal. An FM receiver which is not equipped to reproduce stereophonic signals will reproduce the $(L+R)$ signal only. $(L-R)\cos \omega t$ represents the difference between the left and right audio channel signals amplitude modulated onto a 38 kHz carrier which is suppressed prior to transmission of the composite signal. $P \cos \omega/2$ t is a 19 kHz pilot carrier.

It will be noted that the amplitude modulated carrier (38 kHz) is harmonically related to the pilot carrier (19 kHz), the frequency of the latter being exactly one half of the frequency of the former. In addition, the amplitude modulated carrier and the pilot carrier are in phase. The pilot carrier is a necessary part of the composite signal, since it serves the function of reintroducing the suppressed 38 kHz carrier into the composite signal in the FM multiplex receiver. It can be said that the pilot carrier is a synchronization signal for the correct decoding of the composite signal at the receiver.

In addition to the foregoing components, the composite signal may contain an S.C. A. signal for store casting or subscription music transmission, the use of this signal by the broadcaster being optional. The spectrum of the S.C.A channel presently is 67±7 kHz.

The monophonic signal can frequency modulate the FM broadcast carrier up to 80 percent, if S.C.A is present, or up to 90 percent with no S.C.A., of the maximum modulation (± 75 kHz) permitted by the F.C.C. and D.O.T. regulations. The stereophonic signal also can modulate up to 80 percent with both side bands, or 40 percent with each side band, of the maximum modulation if S.C.A. is present, these figures being 90 percent and 45 percent respectively with no S.C.A. The pilot carrier modulates up to 10 percent, i.e., ± 7.5 kHz assuming 100 percent modulation to be ± 75 kHz. Thus, for FM multiplex transmission, present regulations require an RF signal which may be modulated by the following signals in the noted frequency bands:

$L + R$ from 0 to 15 kHz,

L − R in the form of ± (0 to 15) kHz sidebands of 38 kHz sub-carrier with carrier suppressed and in the band 23 to 53 kHz, a pilot carrier at 19 kHz, A subsidiary carrier (S.C.A.) having a bandwidth from 60 to 74 kHz.

In an FM multiplex receiver a decoder must be provided to derive the audio L and R signals and separate them from each other for individual reproduction. In a conventional FM receiver adapted to reproduce both monaural and stereo signals, it is common practice to provide for automatic switching, i.e., when a stereo signal with its 19 kHz pilot carrier is being received and is of a predetermined minimum strength, the stereo decoder of the receiver will switch automatically from a monaural operating condition to a stereophonic operating condition, and when the 19 kHz pilot carrier is absent from the signal being received, the decoder will revert automatically to its monaural operating condition.

This invention therefore relates to FM receiver that is adapted to receive a composite signal containing a monophonic signal $(L + R)$, a pilot carrier and the sideband frequencies of a carrier suppressed carrier amplitude modulated by an $L - R$ signal, the suppressed carrier being of a frequency harmonically related to the frequency of the pilot carrier, and to separate L and R audio frequency signals from the composite signal, which receiver has a decoder that is adapted to switch automatically from a monaural to a stereophonic operating condition when a signal containing the pilot carrier and of a minimum predetermined strength is being supplied thereto and also that is adapted to switch automatically from a stereophonic to a monaural operating condition when a signal without the pilot carrier, or with the pilot carrier, but then of a strength less than a minimum predetermined strength, is being supplied thereto, the latter signal strength preferably being lower than the former signal strength to avoid "-motorboating."

In the past it has been common practise for the composite signal to be added to the 38 kHz subcarrier that is regenerated in the receiver and then envelope detected using a simple pair of diodes, a balanced diode detector or bipolar transistors having base-emitter junctions that serve as detector diodes, amplified output signals being obtained as the collector electrodes of the transistors. A typical decoder employing four diodes is shown in Canadian Patent Number 780,027 issued Mar. 5, 1968 to Electrohome Limited as assignees of Eric Gschwandtner.

In accordance with this invention, synchronous detection is achieved using as switches only two field effect transistors, whereby a simple, inexpensive and effective decoder is provided.

This invention will become more apparent from the following detailed description, taken in conjunction with the drawings, in which.

Figure 1:
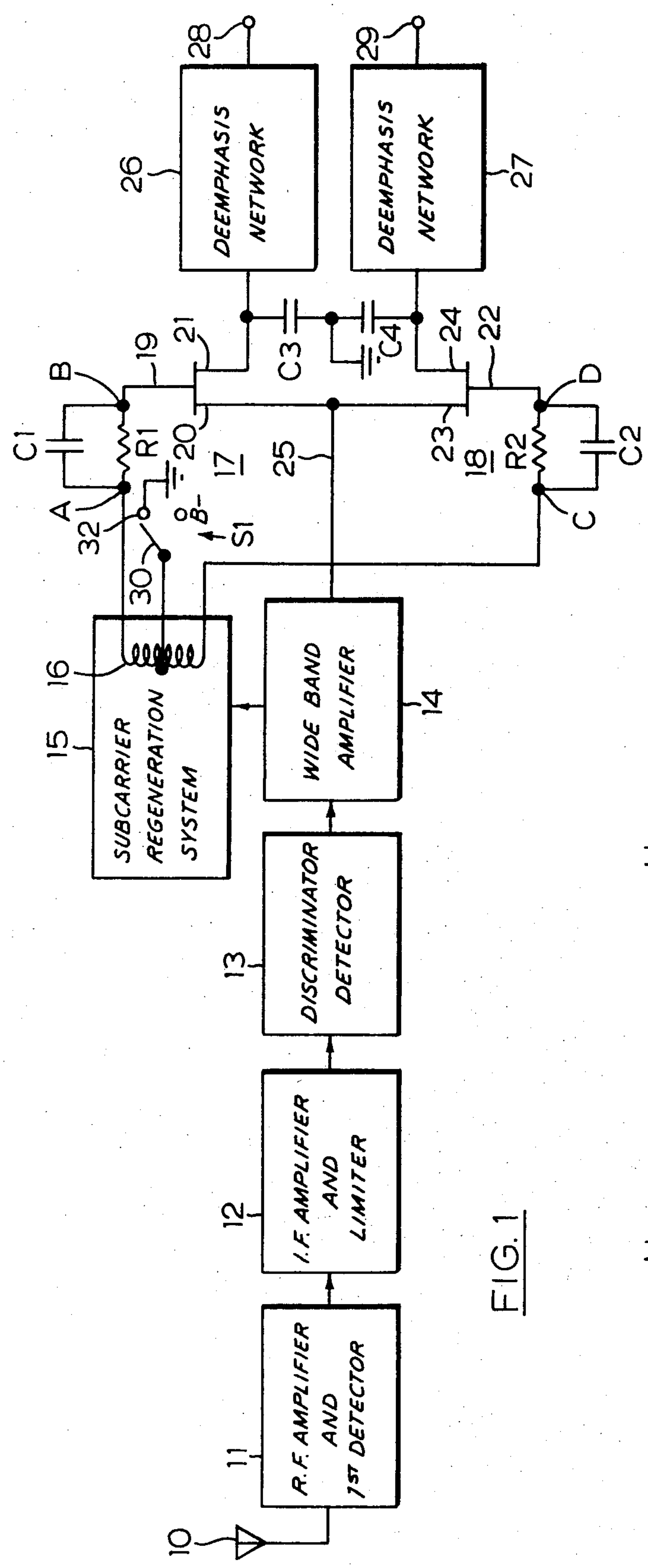
FIG. 1 shows part of an FM radio receiver employing a decoder embodying this invention.

Referring to FIG. 1, FM signals are received by an antenna 10 and are amplified and detected by a conventional RF amplifier and first detector 11. The detected signal is amplified and limited by a conventional IF amplifier and limited 12, and the composite signal representing the modulation of the received signal then is detected by a conventional discriminator detector 13. This signal is amplified by a wide band amplifier 14 and applied to a stereo decoder embodying this invention.

The stereo decoder includes a subcarrier regeneration system 15 that may be of a conventional type. Generally it is a frequency doubler, the 19 kHz pilot carrier of the composite signal being derived in amplifier 14, applied to system 15 and doubled therein to provide a 38 kHz switching signal at the secondary winding 16 of a transformer. A typical subcarrier regeneration system is shown in U.S. Pat. No. 3,535,459 is issued Oct. 20, 1970 to Electrohome Limited as assignees of R.H. Fichtner.

The stereo decoder includes two junction field effect transistors 17 and 18. Transistor 17 has gate, source and drain electrodes 19, 20 and 21 respectively. Transistor 18 has gate, source and drain electrodes 22, 23 and 24 respectively.

It is important that transistors 17 and 18 be junction field effect transistors. If bipolar transistors were used, the 38 kHz switching signal derived across winding 16 would pass through them, and filtering would be required.

Source electrodes 20 and 23 which, in the embodiment shown, are the input electrodes, are connected together, and the composite signal as amplified by amplifier 14 is applied thereto. The output of amplifier 14 feeding the composite signal simultaneously to both source electrodes of field effect transistors 17 and 18 should be of low impedance to facilitate the self-biasing of the gate electrodes of the transistors.

Figure 4:
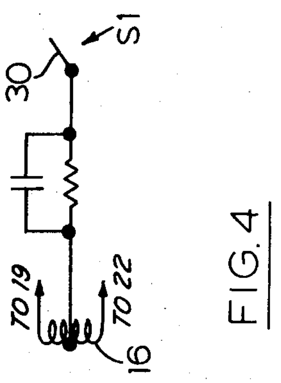
FIG. 4 illustrates a part of another embodiment of this invention.

The switching voltage for field effect transistors 17 and 18 is supplied to the gate electrodes thereof from secondary winding 16 via time constant networks consisting of a capacitor C1 and a resistor R1 and a capacitor C2 and a resistor R2. The center atp of winding 16 is shown as grounded in FIG. 1 with switch S1 in the position illustrated in FIG. 1, but it could be connected to the composite output signal line 25 of amplifier 14, since this line will be at a potential less than one volt DC. Alternatively, the center tap could be connected $B^-$, say −12 volts, or +12 volts if P channel field effect transistors were being used, providing a decoder that would be sensitive only to stereo signals, since the field effect transistors would be back biased except when a 38 kHz switching signal was regenerated. In another but less preferred embodiment capacitors C1 and C2 and resistors R1 and R2 could be replaced with a similarly connected (i.e. in parallel) CR network located between switch S1 and the center tap of winding 16 as shown in FIG. 4.

The drain electrodes of field effect transistors 17 and 18, these electrodes being the output electrodes in the embodiment shown, are connected via deemphasis networks 26 and 27, which may be of conventional design, and which also include capacitors C3 and C4 respectively connected to ground, to the left and right audio output terminals 28 and 29 respectively of the receiver. The signals appearing at the terminals may be further amplified, if necessary, and then applied to loudspeakers or other sound reproducing devices.

The function served by capacitors C3 and C4 is, after conduction of the field effect transistors during sampling, to hold up the drain voltages of the transistors during non-conduction thereof.

Upon reception of a composite signal containing the 19 kHz pilot carrier and above a minimum predetermined level, a 38 kHz switching signal of, say 10 volts will be developed. The gate-source diodes of the field effect transistors will rectify the 38 kHz signal charging capacitors C1 and C2. If resistors R1 and R2 are made large (typically 1 megohm each) and the output impedance of amplifier 14 as seen by sources 20 and 23 is low, the pulses of current that charge capacitors C1 and C2 will have no noticeable effect on the composite signal. This is beneficial, since 38 kHz pulses are undesirable in the audio output signal. Resistors R1 and R2 also should be sufficiently large so as not to appreciably discharge capacitors C1 and C2 during a subcarrier period.

The result of the foregoing will be a small conduction angle (see FIG. 3) with the switches being open during most of the sub-carrier period and conducting only on the peak (positive peak with N channel field effect transistors and negative peak with P channel ones) of the 38 kHz switching signal when the gate and source voltages are close together. Since winding 16 is center tapped and gates 19 and 22 are connected to its start and finish, the field effect transistors will switch on alternately, one sampling the right channel and the other the left, whereby right and left audio output signals will be derived at terminals 29 and 28 respectively.

Figure 2:
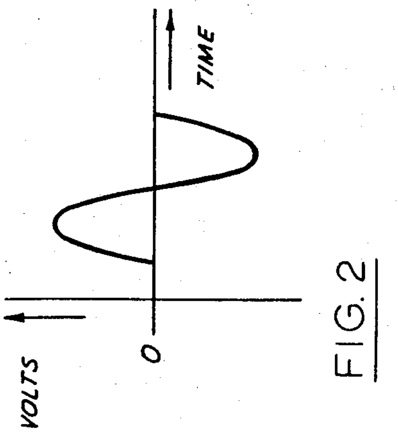
FIGS. 2 and 3 illustrate, on a plot of volts against time, waveforms occurring at two different parts of the decoder shown in FIG. 1.
Figure 3:
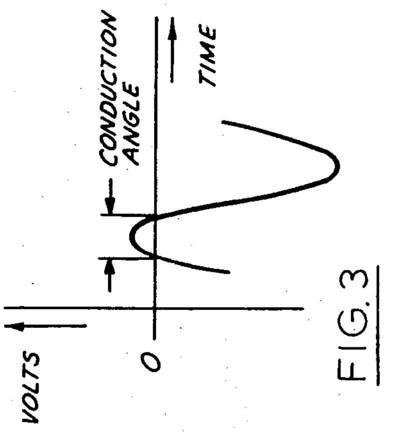

In FIG. 2 there is shown the waveform of the signal at terminal A (FIG. 1) during stereo reception, while the waveform of the signal at terminal B is shown in FIG. 3. The negative shift of the signal is due to terminal B being clamped to essentially the potential of line 25 (several hundred millivolts) on positive half cycles of the 38 kHz signal by the gate-source diode of field effect transistor 17. The small conduction angle of this transistor is shown in FIG. 3. The waveform at terminals C and D (FIG. 1) would be identical to those of FIGS. 2 and 3 respectively but displaced 180°.

It should be noted that the switches operate at zero source-drain bias, resulting in offset-free switching, i.e., input voltage same as output voltage. Moreover, since the time constants of R1, C1 and of R2, C2 are small and the output impedance of amplifier 14 is low, the gate voltages will follow the source voltages without causing appreciable distortion. The drain voltages will follow the source voltages, since turned on field effect transistors represent low value resistive elements. In contract to prior art networks using bipolar transistors, it is important to note that there is no external DC path to the drain electrodes of the field effect transistors resulting in offset-free switching and minimizing unwanted 38 kHz ripple in the output signals.

During monaural operation with no 19 kHz pilot carrier present and hence no regenerated 38 kHz subcarrier, capacitors C1 and C2 will discharge through resistors R1 and R2 respectively until both gate-source diodes conduct or until transistors 17 and 18 are at zero bias turning on the field effect transistors fully and resulting in identical outputs at terminals 28 and 29.

As mentioned previously and shown in FIG. 1, for stereo only signal reception the movable contact 30 of switch S1 may be moved to connect with fixed contact 31 of switch S1, contact 31 being connected to a suitable negative DC potential $B^-$, say −12 volts. When contact 30 is connected to grounded contact 32 of the switch, both monaural and stereo signals may be reproduced.

While preferred embodiments of this invention have been disclosed herein, those skilled in the art will appreciate that changes and modifications may be made therein without departing from the spirit and scope of this invention as defined in the appended claims. Thus, for example, while present F.C.C. and D.O.T. specifications make the use of a frequency doubler necessary, it will be understood that should these regulations change, a frequency quadrupler, for example, might be used.

What I claim as my invention is:

1. In an FM receiver adapted to receive a composite signal containing a monophonic signal ($L + R$), a pilot carrier and the sideband frequencies of a carrier suppressed carrier amplitude modulated by an $L - R$ signal, said suppressed carrier being of a frequency harmonically related to the frequency of said pilot carrier, and to separate $L$ and $R$ audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than a minimum predetermined strength is being supplied thereto, said decoder also being adapted to switch automatically from said stereophonic operating condition to said monaural operating condition when a signal that is without said pilot carrier is being supplied thereto, said decoder comprising means responsive to said receiver receiving said composite signal at a strength above a minimum predetermined strength for providing a switching signal at a frequency corresponding to an integral multiple of the frequency of said pilot carrier, two junction field effect transistors each have gate, input and output electrodes, means connecting capacitors in circuit between said means for providing said switching signal and said gate electrodes for charging of said capacitors by said switching signal, resistors connected in shunt with said capacitors, and means for applying said composite signal to said input electrodes of said field effect transistors when said composite signal is received by said receiver at a strength above a minimum predetermined strength, said receiver including right and left audio signal output terminals, means connecting said output electrode of one of said transistors and one of said output terminals and means connecting said output electrode of the other of said transistors and the other of said terminals.

2. The invention according to claim 1, wherein said means for providing said switching signal includes a sub-carrier regeneration system having a transformer with a secondary winding across which said switching signal is developed.

3. The invention according to claim 2, wherein said winding has first and second terminals and a center tap therebetween, one of said capacitors being connected between said first terminal and said gate electrode of one of said transistors and the other of said capacitors being connected between said second terminal and the other of said transistors.

4. The invention according to claim 3 including means grounding said center tap.

5. The invention according to claim 3 including means for applying to said center a DC potential for reverse biasing said transistors.

6. The invention according to claim 2, wherein said sub-carrier regeneration system is a frequency doubler.

7. The invention according to claim 1, wherein said means for applying said composite signal to said input electrodes comprises an amplifier having a high output impedance and wherein said resistors have a high impedance.

8. In an FM receiver adapted to receive a composite signal containing a monophonic signal ($L + R$), a pilot carrier and the sideband frequencies of a carrier suppressed carrier amplitude modulated by an $L - R$ signal, said suppressed carrier being of a frequency harmonically related to the frequency of said pilot carrier, and to separate $L$ an $R$ audio frequency signals from said composite signal, a decoder adapted to switch automatically from a monaural operating condition to a stereophonic operating condition when a signal containing said pilot carrier and of a minimum predetermined strength is being supplied thereto and also adapted to switch automatically from said stereophonic operating condition to said monaural operating condition when a signal containing said pilot carrier and of a strength lower than a minimum predetermined strength is being supplied thereto, said decoder also being adapted to switch automatically from said stereophonic operating condition to said monaural operating condition when a signal that is without said pilot carrier is being supplied thereto, said decoder comprising means responsive to said receiver receiving said composite signal at a strength above a minimum predetermined strength for providing a switching signal at a frequency corresponding to an integral multiple of the frequency of said pilot carrier, said means for providing said switching signal including a sub-carrier regeneration system having a transformer with a secondary winding across which said switching signal is developed, said secondary winding having a center tap, two junction field effect transistors each having gate, input and output electrodes, means connecting a capacitor in circuit with said center tap for charging of said capacitor by said switching signal, a resistor connected in shunt with said capacitor, means connecting said secondary winding and said gate electrodes, means for applying said composite signal to said input electrodes of said field effect transistors when said composite signal is received by said receiver at a strength above a minimum predetermined strength, said receiver including right and left audio signal output terminals, means connecting said output electrode of one of said transistors and one of said output terminals and means connecting said output electrode of the other of said transistors and the other of said terminals.

9. The invention according to claim 8 wherein said capacitor is connected between said center tap and a grounded terminal.

10. The invention according to claim 8 wherein said capacitor is connected between said center tap and a terminal at a DC potential that reverse biases said transistors.

* * * * *